US009903090B2

(12) United States Patent
Daniel et al.

(10) Patent No.: US 9,903,090 B2
(45) Date of Patent: Feb. 27, 2018

(54) SYSTEM AND METHOD FOR VIBRATION MONITORING OF A MINING MACHINE

(71) Applicant: Harnischfeger Technologies, Inc., Wilmington, DE (US)

(72) Inventors: Kenneth J. Daniel, Libertyville, IL (US); Jose Torres, Antofagasta (CL); Mark Emerson, Germantown, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 13/743,894

(22) Filed: Jan. 17, 2013

(65) Prior Publication Data

US 2013/0184927 A1    Jul. 18, 2013

Related U.S. Application Data

(60) Provisional application No. 61/587,890, filed on Jan. 18, 2012, provisional application No. 61/594,234, filed on Feb. 2, 2012.

(51) Int. Cl.
*E02F 3/36* (2006.01)
*G06F 11/30* (2006.01)
(Continued)

(52) U.S. Cl.
CPC ............... *E02F 3/36* (2013.01); *E02F 3/46* (2013.01); *E02F 9/267* (2013.01); *G01M 7/00* (2013.01); *G06F 11/30* (2013.01)

(58) Field of Classification Search
CPC ................................. E02F 3/36; G06F 11/30
(Continued)

(56) References Cited

U.S. PATENT DOCUMENTS 3,489,013 A    1/1970    Taylor et al.
4,281,876 A *  8/1981    Lansberry ............. 299/1.4
(Continued)

FOREIGN PATENT DOCUMENTS

CL    200801327    8/2008
CN    2797780      7/2006
(Continued)

OTHER PUBLICATIONS

First Office Action from the Australian Patent Office for Application No. 2013200326 dated Apr. 22, 2014 (4 pages).
(Continued)

*Primary Examiner* — Jerrah Edwards
*Assistant Examiner* — Majdi Alsomiri
(74) *Attorney, Agent, or Firm* — Michael Best & Friedrich LLP (57) ABSTRACT

A mining machine having a control system for operating the mining machine, the control system having a vibration monitor. The mining machine comprising a mining machine, a sensor sensing vibration of a component of the mining machine, and a vibration module. The vibration module determining when the mining machine is moving in a predetermined cycle, obtaining vibration sensor data from the sensor based on determining that the mining machine is moving in a predetermined cycle, processing the vibration sensor data to generate processed vibration data, and outputting the processed vibration data.

33 Claims, 10 Drawing Sheets

(51) Int. Cl.
*E02F 3/46* (2006.01)
*E02F 9/26* (2006.01)
*G01M 7/00* (2006.01)

(58) Field of Classification Search
USPC ..... 701/29.1; 299/1.05, 1.1–1.5, 1.8, 10, 31, 299/73
See application file for complete search history.

(56) References Cited

U.S. PATENT DOCUMENTS

| | | | |
|---|---|---|---|
| 4,655,082 A * | 4/1987 | Peterson | 73/594 |
| 5,528,203 A | 6/1996 | Mohwinkel et al. | |
| 5,668,512 A | 9/1997 | Mohwinkel et al. | |
| 5,895,857 A | 4/1999 | Robinson et al. | |
| 6,062,650 A * | 5/2000 | Smith et al. | 299/1.4 |
| 6,527,130 B2 * | 3/2003 | Ruddy | 212/278 |
| 6,832,521 B1 * | 12/2004 | Courtney et al. | 73/658 |
| 7,099,782 B2 | 8/2006 | Hitchcock et al. | |
| 7,360,844 B2 * | 4/2008 | Frederick et al. | 299/1.2 |
| 7,627,441 B2 | 12/2009 | Longsdorf et al. | |
| 7,686,400 B2 * | 3/2010 | Fredrick et al. | 299/1.1 |
| 7,695,071 B2 * | 4/2010 | Jackson et al. | 299/1.05 |
| 7,887,142 B2 * | 2/2011 | Hall et al. | 299/1.5 |
| 8,016,363 B2 * | 9/2011 | Jackson et al. | 299/1.4 |
| 8,061,782 B2 * | 11/2011 | Hall et al. | 299/1.5 |
| 8,172,334 B2 * | 5/2012 | Lindbergh et al. | 299/1.8 |
| 8,174,402 B2 | 5/2012 | Bouse et al. | |
| 2002/0144968 A1 | 10/2002 | Ruddy | |
| 2004/0207247 A1 | 10/2004 | Jackson et al. | |
| 2005/0034902 A1 * | 2/2005 | Madhavarao et al. | 177/136 |
| 2010/0063691 A1 | 3/2010 | Hall et al. | |
| 2010/0065290 A1 | 3/2010 | Hall et al. | |
| 2010/0109417 A1 | 5/2010 | Jackson et al. | |

FOREIGN PATENT DOCUMENTS

| | | |
|---|---|---|
| CN | 101963797 | 2/2011 |
| CN | 201993166 | 9/2011 |

OTHER PUBLICATIONS

Emerson Process Management, "Now You Have a Choice, The CSI 6500 Upgrade Program," CSI 6500 Machinery Health Monitor, specification sheet, (2011) 2 pages, www.assetweb.com/mhm, Knoxville.
Emerson Process Management, "Case Seismic Vibration Monitor Specifications," CSI 6500 Machinery Health Monitor, specification sheet (2011) 5 pages, www.assetweb.com/mhm, Knoxville.
Emerson Process Management, "Speed and Key Monitor Specifications," CSI 6500 Machinery Health Monitor, specification sheet (2011) 6 pages, www.assetweb.com/mhm, Knoxville.
Emerson Process Management, "16-Channel Output Relay Module Specificaitons," CSI 6500 Machinery Health Monitor, specification sheet (2011) 4 pages, www.assetweb.com/mhm, Knoxville.
Emerson Process Management, "Shaft Absolute Vibration Monitor Specifications," CSI 6500 Machinery Health Monitor, specification sheet (2011) 5 pages, www.assetweb.com/mhm, Knoxville.
Emerson Process Management, "Case Piezoelectric Vibration Monitor Specifications," CSI 6500 Machinery Health Monitor, specification sheet (2011) 5 pages, www.assetweb.com/mhm, Knoxville.
Emerson Process Management, "Predictive Diagnostics from Rotation Equipment Prevent Unscheduled Downtime," Online Machinery Health Management, specification sheet (2011) 2 pages, www.assetweb.com/mhm, Knoxville.
First Office Action from the Australian Patent Office for Application No. 2014233575 dated Jul. 10, 2015 (3 pages).
First Office Action from the Chilean Intellectual Property Office for Application No. 0180-2013, first known to us Feb. 1, 2016, (13 pages, which includes English Statement of Relevance).
First Office Action from the State Intellectual Property Office of China for Application No. 201320112934.5 dated Jun. 5, 2013 (4 pages, which includes a Statement of Relevance).
Second Office Action from the State Intellectual Property Office of China for Application No. 201320112934.5 dated Nov. 28, 2013 (3 pages, which includes a Statement of Relevance).
First Office Action from the State Intellectual Property Office of China for Application No. 2013100794251 dated Dec. 17, 2015 (18 pages).
Second Office Action from the State Intellectual Property Office of China for Application No. 201310079425.1 dated Aug. 30, 2016 (9 pages).
Second Office Action from the Chilean Intellectual Property Office for Application No. 0180-2013, first known to us Jul. 20, 2016, (15 pages, which includes English Statement of Relevance).
Declaration of Kenneth Daniel Ph.D. for U.S. Appl. No. 13/743,894 dated Nov. 21, 2016, (2 pages).
Second Office Action from the State Intellectual Property Office of China for Application No. 201310079425.1 dated Mar. 10, 2017 (14 pages).
Chilean Intellectual Property Office Action for Application 201600747 dated Aug. 25, 2017 (8 pages which includes English Statement of Relevance).
Chinese Patent Office Action for Application No. 20130079425.1 dated Aug. 24, 2017 (11 pages English Translation Included).

* cited by examiner

SYSTEM AND METHOD FOR VIBRATION MONITORING OF A MINING MACHINE

RELATED APPLICATIONS

The present application claims priority to U.S. Provisional Application 61/587,890, filed Jan. 18, 2012, and U.S. Provisional Application 61/594,234, filed Feb. 2, 2012, the entire contents of which is hereby incorporated

BACKGROUND

The present invention relates to vibration monitoring and analysis for electric mining shovels. Two conventional types of vibration monitoring and analysis on mining machines include manual testing and primitive operational monitoring. Manual testing involved placing mining machines off-line and interrupting regular mining operations. Then, personnel would secure one or two vibration sensors on or near one or more moving components of the to-be-analyzed mining machine. The personnel would then instruct the operator of the mining machine to operate the mining machine in a particular way in order to capture vibration data. Thereafter, the captured data would be analyzed for diagnostic purposes. Manual testing was a labor intensive activity that required a high level of expertise for placement of vibration data sensors, vibration data collection, and vibration data analysis. Additionally, manual testing required interruption of mining operations for several hours. Primitive operational monitoring involved installing a vibration monitor for capture of vibration data during operation of the mining machine. The capture of vibration data was initiated based on two factors, motor speed and motor rotation direction. The capture of vibration data was not based on the shovel's operating cycle, but rather simply motor speed and rotational direction. This technique resulted not only in inefficient and inconsistent data capture, but collected vibration data that was difficult to analyze.

SUMMARY

Vibration monitoring enables monitoring of the overall bearing and shaft health of an electric mining shovel.

In one embodiment, the invention provides a mining machine having a control system for operating the mining machine, the control system having a vibration monitor. The mining machine comprising a mining machine, a sensor sensing vibration of a component of the mining machine, and a vibration module. The vibration module determining when the mining machine is moving in a predetermined cycle, obtaining vibration sensor data from the sensor based on determining that the mining machine is moving in a predetermined cycle, processing the vibration sensor data to generate processed vibration data, and outputting the processed vibration data.

In another embodiment the invention provides a method of testing mining equipment. The method comprising monitoring operation of a mining machine; determining a component of the mining machine is moving in a predetermined cycle; determining the component of the mining machine is moving at a constant speed, within a predefined speed range; obtaining vibration data of the mining machine based on determining that the component of the mining machine is moving in a predetermined cycle and at a constant speed, within a predefined speed range; processing the vibration data to generate processed vibration data; and outputting the processed vibration data.

In some embodiments, the invention includes a mining machine including a simulated tachometer and a vibration monitoring module. The simulated tachometer may include a voltage monitor, or a voltage monitor and a voltage-to-pulse converter, which are used to determine a speed of a component of the mining machine to generate sensed speed, which is outputted to the vibration module. The vibration module senses vibrations of the component of the mining machine, based on the sensed speed, and generates vibration data. The vibration module then processes the vibration data to generate a spectral waveform. The processing may include a Fourier transform and may be based in part on the sensed speed to adjust for variations in the speed of the component during collection of the vibration data. The component may be one of a hoist motor, crowd motor, swing motor, hoist gearbox, crowd gearbox, and swing gearbox.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

Figure 1:
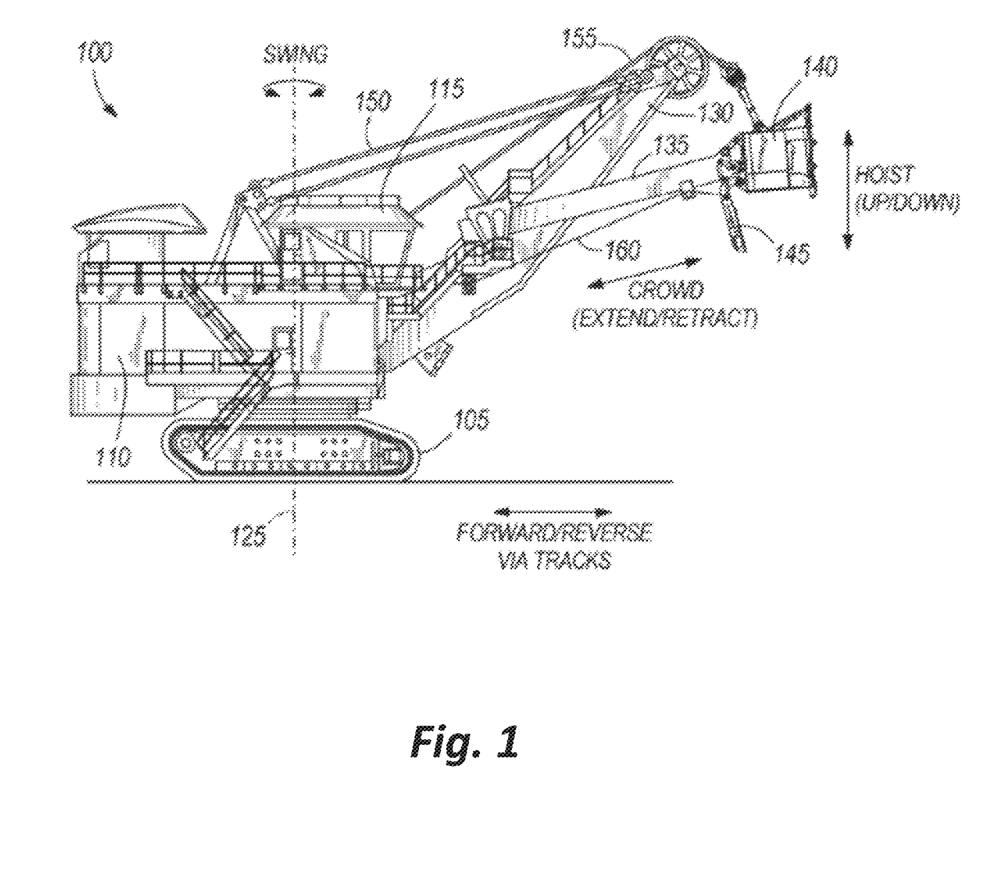
FIG. 1 illustrates an electric mining shovel.

FIG. 1 illustrates an electric mining shovel 100. The embodiment shown in FIG. 1 illustrates the electric mining shovel 100 as a rope shovel, however in other embodiments the electric mining shovel 100 can be a different type of mining machine, for example, a hybrid mining shovel, a dragline excavator, etc. The mining shovel 100 includes tracks 105 for propelling the rope shovel 100 forward and backward, and for turning the rope shovel 100 (i.e., by varying the speed and/or direction of the left and right tracks relative to each other). The tracks 105 support a base 110 including a cab 115. The base 110 is able to swing or swivel about a swing axis 125, for instance, to move from a digging location to a dumping location. Movement of the tracks 105 is not necessary for the swing motion. The rope shovel further includes a dipper shaft 130 supporting a pivotable dipper handle 135 (handle 135) and dipper 140. The dipper 140 includes a door 145 for dumping contents from within the dipper 140 into a dump location, such as a hopper or dump-truck.

The rope shovel 100 also includes taut suspension cables 150 coupled between the base 110 and dipper shaft 130 for supporting the dipper shaft 130; a hoist cable 155 attached to a winch (not shown) within the base 110 for winding the cable 155 to raise and lower the dipper 140; and a dipper door cable 160 attached to another winch (not shown) for opening the door 145 of the dipper 140. In some instances, the rope shovel 100 is a P&H® 4100 series shovel produced by P&H Mining Equipment Inc., although the electric mining shovel 100 can be another type or model of electric mining equipment.

When the tracks 105 of the mining shovel 100 are static, the dipper 140 is operable to move based on three control actions, hoist, crowd, and swing. The hoist control raises and lowers the dipper 140 by winding and unwinding hoist cable 155. The crowd control extends and retracts the position of the handle 135 and dipper 140. In one embodiment, the handle 135 and dipper 140 are crowded by using a rack and pinion system. In another embodiment, the handle 135 and dipper 140 are crowded using a hydraulic drive system. The swing control swivels the handle 135 relative to the swing axis 125. Before dumping its contents, the dipper 140 is maneuvered to the appropriate hoist, crowd, and swing positions to 1) ensure the contents do not miss the dump location; 2) the door 145 does not hit the dump location when released; and 3) the dipper 140 is not too high such that the released contents would damage the dump location.

Figure 2:
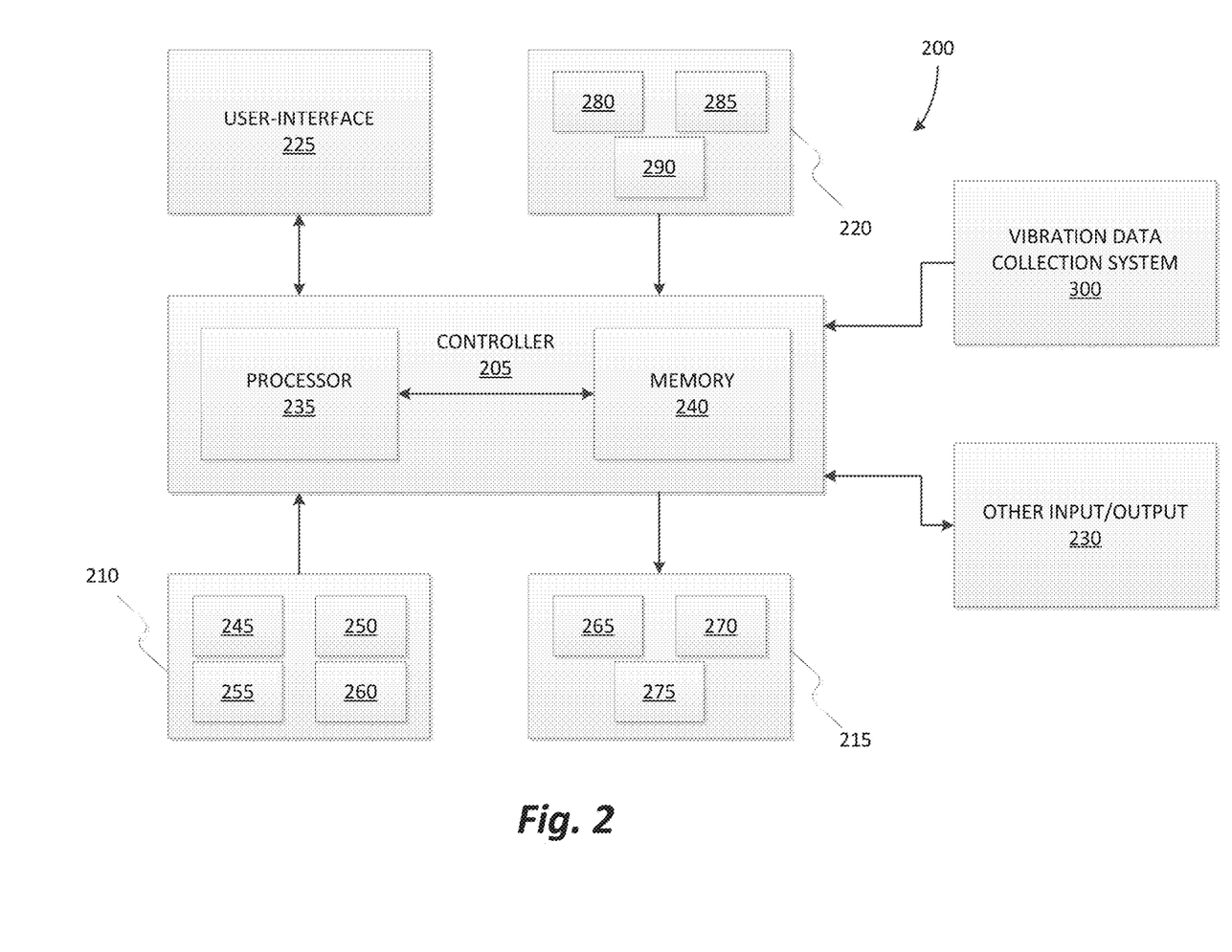
FIG. 2 illustrates a block diagram of a control system of the mining shovel of FIG. 1.

As shown in FIG. 2, the mining shovel 100 includes a control system 200. The control system 200 includes a controller 205, operator controls 210, dipper controls 215, sensors 220, a user-interface 225, and other input/outputs 230. The controller 205 includes a processor 235 and memory 240. The memory 240 stores instructions executable by the processor 235 and various inputs/outputs for, e.g., allowing communication between the controller 205 and the operator or between the controller 205 and sensors 220. In some instances, the controller 205 includes one or more of a microprocessor, digital signal processor (DSP), field programmable gate array (FPGA), application specific integrated circuit (ASIC), or the like.

The controller 205 receives input from the operator controls 210. The operator controls 210 include a crowd control 245, a swing control 250, a hoist control 255, and a door control 260. The crowd control 245, swing control 250, hoist control 255, and door control 260 include, for instance, operator controlled input devices such as joysticks, levers, foot pedals, and other actuators. The operator controls 210 receive operator input via the input devices and output digital motion commands to the controller 205. The motion commands include, for example, hoist up, hoist down, crowd extend, crowd retract, swing clockwise, swing counterclockwise, dipper door release, left track forward, left track reverse, right track forward, and right track reverse.

Upon receiving a motion command, the controller 205 generally controls dipper controls 215 as commanded by the operator. The dipper controls 215 include one or more crowd motors 265, one or more swing motors 270, and one or more hoist motors 275. For instance, if the operator indicates via swing control 250 to rotate the handle 135 counterclockwise, the controller 305 will generally control the swing motor 270 to rotate the handle 135 counterclockwise. However, in some embodiments of the invention the controller 205 is operable to limit the operator motion commands and generate motion commands independent of the operator input.

The controller 205 is also in communication with a number of sensors 220 to monitor the location and status of the dipper 140. For example, the controller 205 is in communication with one or more crowd sensors 280, one or more swing sensors 285, and one or more hoist sensors 290. The crowd sensors 280 indicate to the controller 205 the level of extension or retraction of the dipper 140. The swing sensors 285 indicate to the controller 205 the swing angle of the handle 135. The hoist sensors 290 indicate to the controller 205 the height of the dipper 140 based on the hoist cable 155 position. In other embodiments there are door latch sensors which, among other things, indicate whether the dipper door 145 is open or closed and measure weight of a load contained in the dipper 140

The user-interface 225, such as an operator user-interface, provides information to the operator about the status of the mining shovel 100 and other systems communicating with the mining shovel 100. The user-interface 225 includes one or more of the following: a display (e.g. a liquid crystal display (LCD)); one or more light emitting diodes (LEDs) or other illumination devices; a heads-up display (e.g., projected on a window of the cab 115); speakers for audible feedback (e.g., beeps, spoken messages, etc.); tactile feedback devices such as vibration devices that cause vibration of the operator's seat or operator controls 210; or another feedback device.

Figure 3:
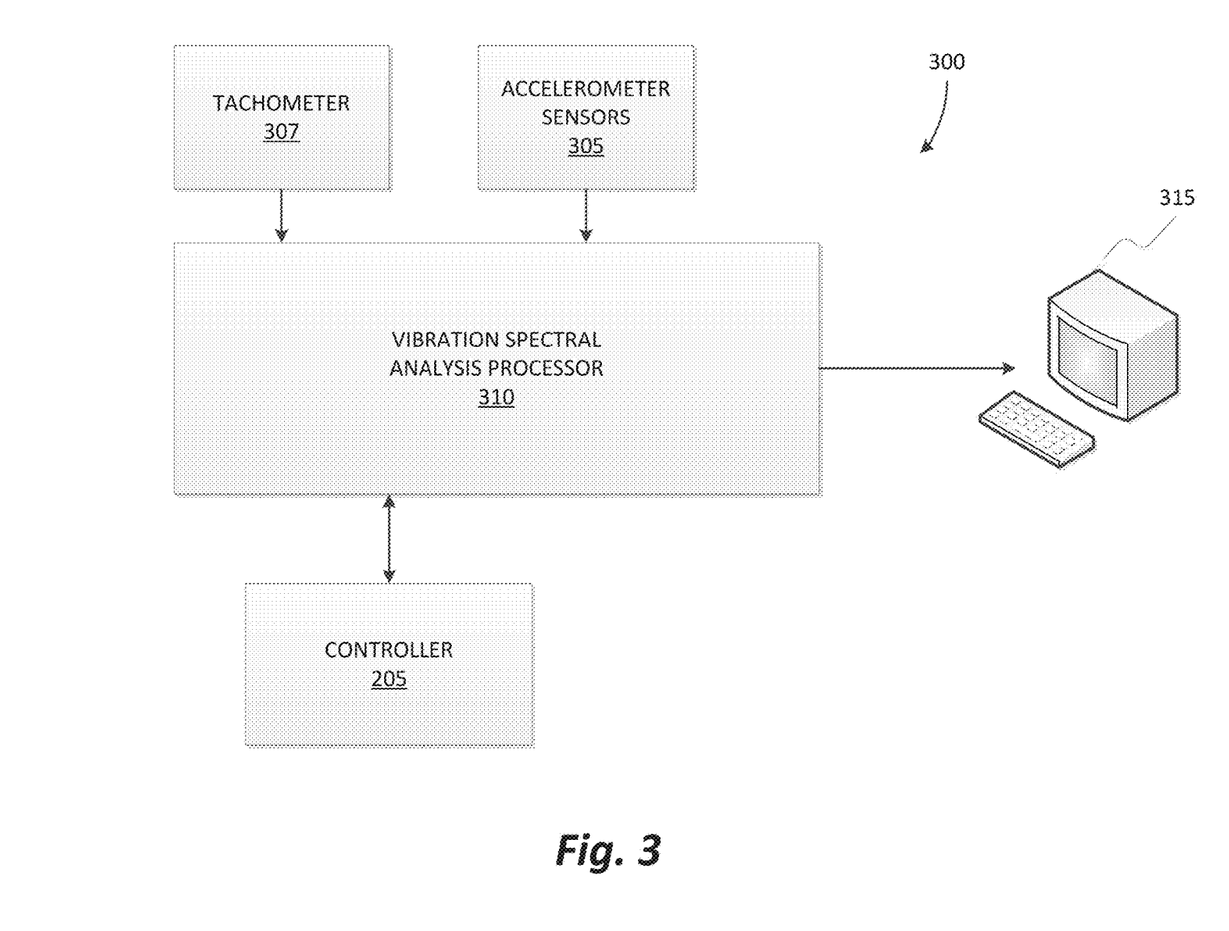
FIG. 3 illustrates a block diagram of a vibration data collection system of the mining shovel.

FIG. 3 illustrates a block diagram of a vibration data collection system 300 of the mining shovel 100. The vibration data collection system 300 includes one or more accelerometer sensors 305, one or more tachometers 307, a vibration spectral analysis processor 310, and a server 315. The data collection system 300 is further electrically coupled to the controller 205.

The accelerometer sensors 305 collect vibration data of the mining shovel 100 while the mining shovel 100 is in operation. The accelerometer sensors 305 measure vibrations of a structure. The force caused by vibrations causes a force onto the piezoelectric material within the accelerometer sensors 305. The piezoelectric material produces an electric charge which is proportional to the force exerted upon it. The accelerometer sensors 305 may be radial accelerometer sensors or axial accelerometer sensors. The radial accelerometer sensors measure the acceleration on bearings of the mining shovel 100. The axial accelerometer sensors measure the acceleration on shafts of the mining shovel 100. The accelerometer sensors 305 are located at various locations on the mining shovel 100 including, among other locations, the one or more crowd motors 265, the one or more swing motors 270, the one or more hoist motors 275, a hoist gearbox, a crowd gearbox, and a swing gearbox.

The tachometers 307 measure the rotational speed of the various motors of the mining shovel 100. Each tachometer 307 can either be a physical tachometer or a simulated tachometer. A physical tachometer is an instrument that physically measures the rotational speed of a motor for example, using a optical or a magnetic sensor. Simulated tachometers are described in more detail below.

The vibration spectral analysis processor 310 processes vibration data from the accelerometer sensors 305 and outputs processed vibration data. In some embodiments the vibration spectral analysis processor 310 outputs the raw vibration data along with the processed vibration data. The vibration spectral analysis processor 310 includes a processor and memory. The processor executes instructions stored on the memory for analyzing and processing the received data from the accelerometer sensors 305. In some instances the vibration spectral analysis processor 310 is a microprocessor, digital signal processor (DSP), field programmable gate array (FPGA), application specific integrated circuit (ASIC), or the like. In some embodiments, the vibration spectral analysis processor 310 processes the vibration data by creating a sound file of the vibration data. The vibration spectral analysis processor 310 then performs a Fourier transform on the created sound file to create a vibration spectrum. In other embodiments, other spectral analysis algorithms are applied to create different variations of the spectrum or analyze the data in another way.

Figure 4:
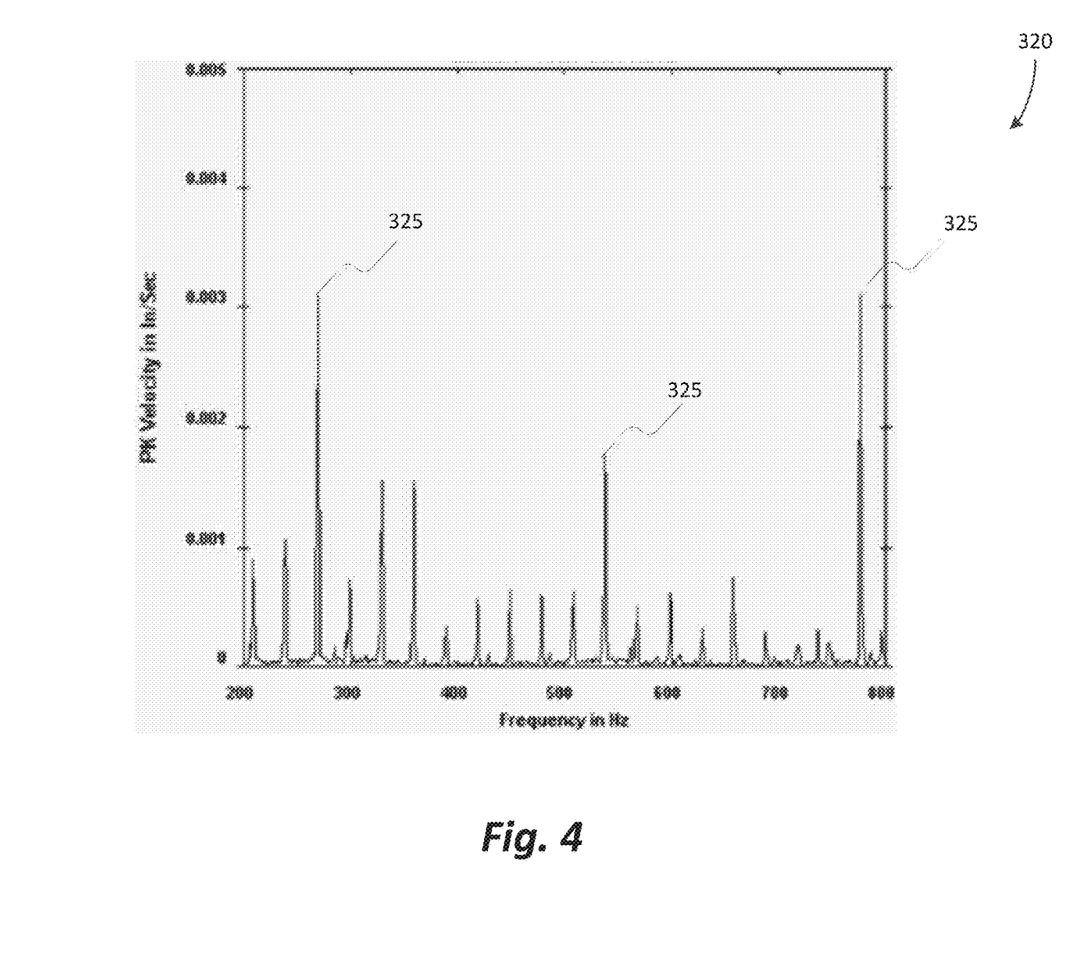
FIG. 4 illustrates a vibration spectrum analysis.

FIG. 4 illustrates an exemplary vibration spectrum 320 created by the vibration spectral analysis processor 310. A single vibration spectrum 320 corresponds to a part of the mining shovel 100 being monitored, such as a cooling fan, a gearbox, a transmission, or a motor (e.g., a hoist motor 275). Therefore, the vibration spectral analysis processor 310 creates multiple vibration spectrums 320 for each monitored part of the mining shovel 100. A spectrum 320 includes several peaks 325. Peaks 325 of a vibration spectrum 320 with an abnormally high amplitude indicate possible mechanical failure or future failure on a corresponding part of the mining shovel 100 (e.g., an exhaust fan, or one of the hoist motors 275). Vibration data may be obtained and processed periodically (e.g., on a weekly basis) to generate multiple spectrums 320 for each monitored part of the mining shovel 100. A failure or impending failure may also be identified when a peak 325 for a particular frequency is shown to be increasing over time (e.g., over a few periodically created spectrums 320).

The server 315 is used to communicate the processed and/or raw vibration data, including the one or more vibration spectrums 320, from the vibration spectral analysis processor 310 to a central location for further analysis. The server 315 may be in communication with the vibration spectrum analysis processor 310 via a local area network, a wide area network, a wireless network, the Internet, or the like.

In some embodiments, to collect valid vibration measurements, the vibration data collection system 300 obtains vibration data while movement of a component of the mining shovel 100 being tested is at a constant speed (i.e., movement of the dipper such as by swinging, crowding, hoisting, etc. at a constant speed) that is within a predefined speed range. In some embodiments, the speed is determined to be constant while the speed is varying by 50 RPM, 100 RPM, 300 RPM, or up to 600 RPM. When the speed varies, an algorithm may be used to account for the variations in speed. In some embodiments one to three seconds of vibration data is captured during movement at a constant speed, within the range, for accurate vibration analysis. In some embodiments, the speed of the component of the mining shovel 100 does not need to be within a predefined speed range. Constant speed can be maintained or identified during operation by a variety of methods explained in detail below.

Stage Testing

Stage testing is one embodiment of vibration data collection. Stage testing includes the mining shovel 100 moving in various predetermined patterns while the vibration data is collected by the data collection system 300. By moving in predetermined patterns, vibration data can be captured at known points when the mining shovel 100 is operating at a constant speed. The predetermined patterns include, but are not limited to: hoisting the dipper 140 up and down; crowding the dipper 140 in and out; and swinging the handle 135 left and right. For example, when hoisting the dipper 140 up, the dipper 140 will move at a constant speed, within the predefined speed range, for approximately one to three seconds. Once the dipper 140 has been hoisted all the way up, the dipper 140 is stopped at the top and hoisted down. When the dipper 140 is hoisted down, the dipper 140 will move at a constant speed, within the range, for approximately one to three seconds until the dipper 140 is hoisted all the way down. This is repeated until enough vibration data is collected. In some instances, such as when hoisting the dipper 140 up and down, the predefined speed range is 1000 RPM to 1500 RPM. The predefined speed range may be different for other components or other predetermined patterns.

FIGS. 5a-5d illustrate the stage testing operator instructions as they are displayed on the user-interface 225, such as the operator user-interface, in one embodiment. Although discussed as being displayed on the user-interface 225, in other embodiments, the stage testing instructions are displayed and/or generated audibly on a separate user-interface.

Figure 5A:
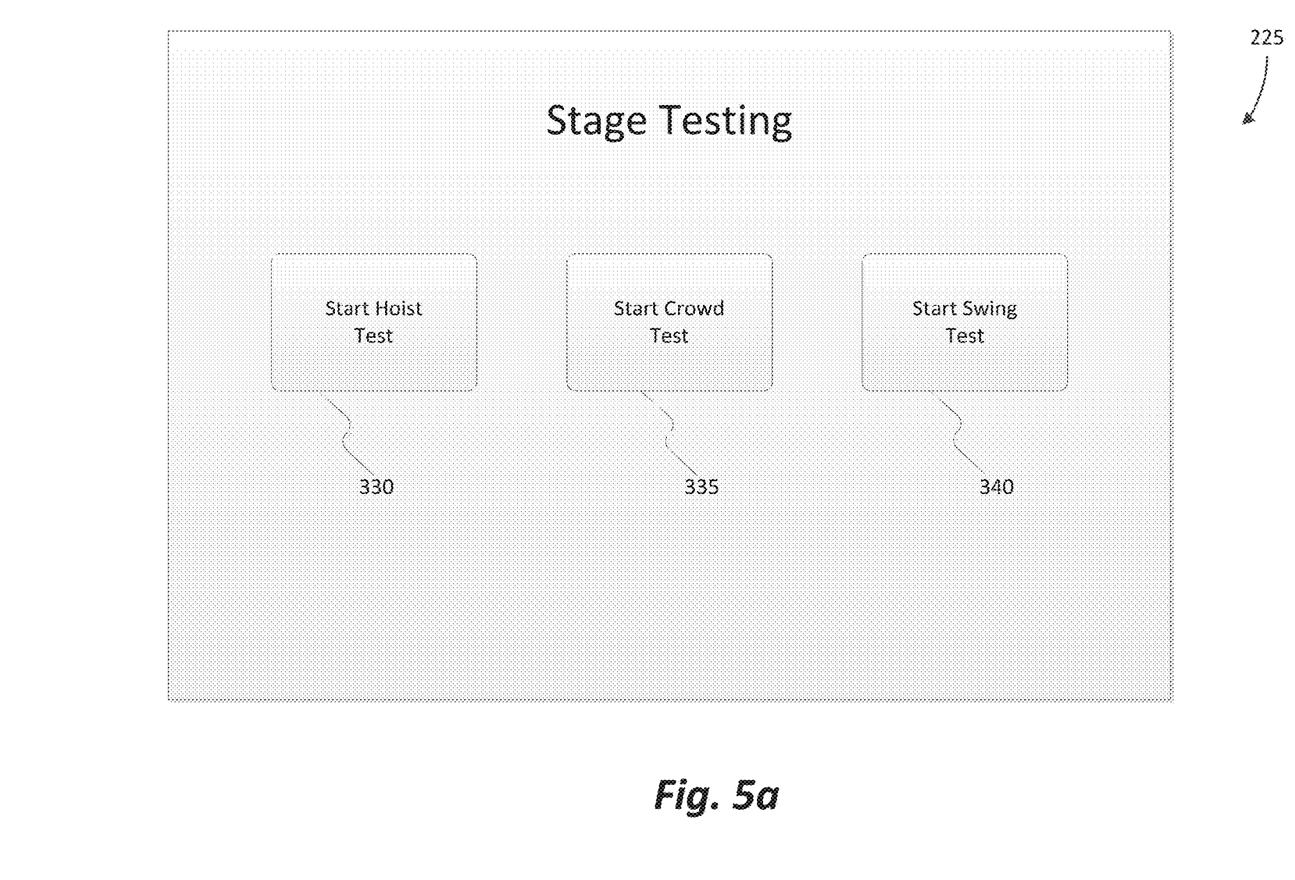
FIGS. 5a-5d illustrate a user-interface of the control system.

As shown in FIG. 5a, the operator begins stage testing operations by selecting to begin a specific stage test using the user-interface 225. For example, the operator uses the user-interface 225 to select hoist stage testing 330, crowd stage testing 335, swing stage testing 340, or other various stage tests.

Figure 5B:
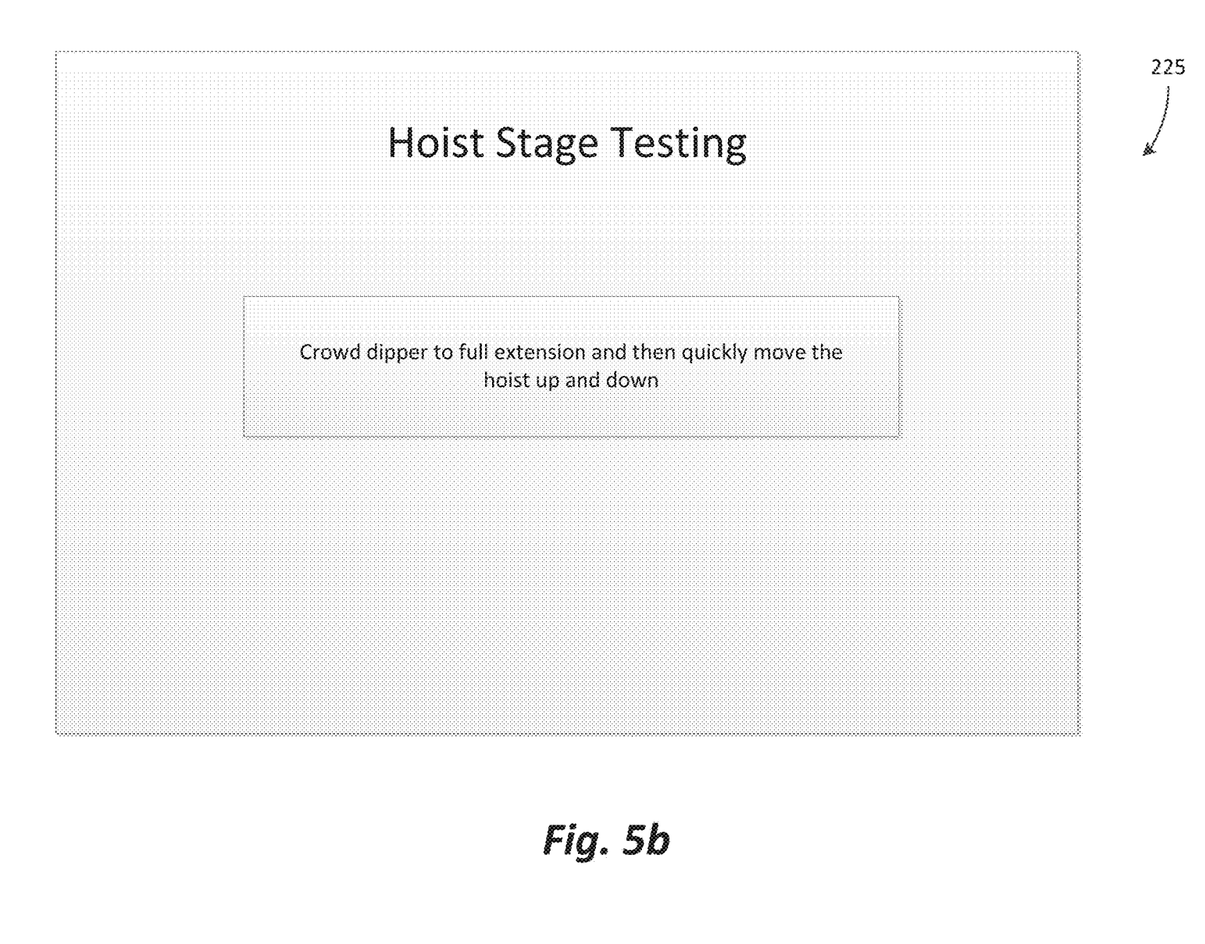

As shown in FIG. 5b, once the operator has selected the specific stage test, the user-interface 225 informs the operator of the steps necessary to begin the testing. For example, as shown in FIG. 5b, the user-interface 225 informs the operator to begin the test by instructing the operator to "Crowd dipper to full extension and then quickly move the hoist up and down."

Figure 5C:
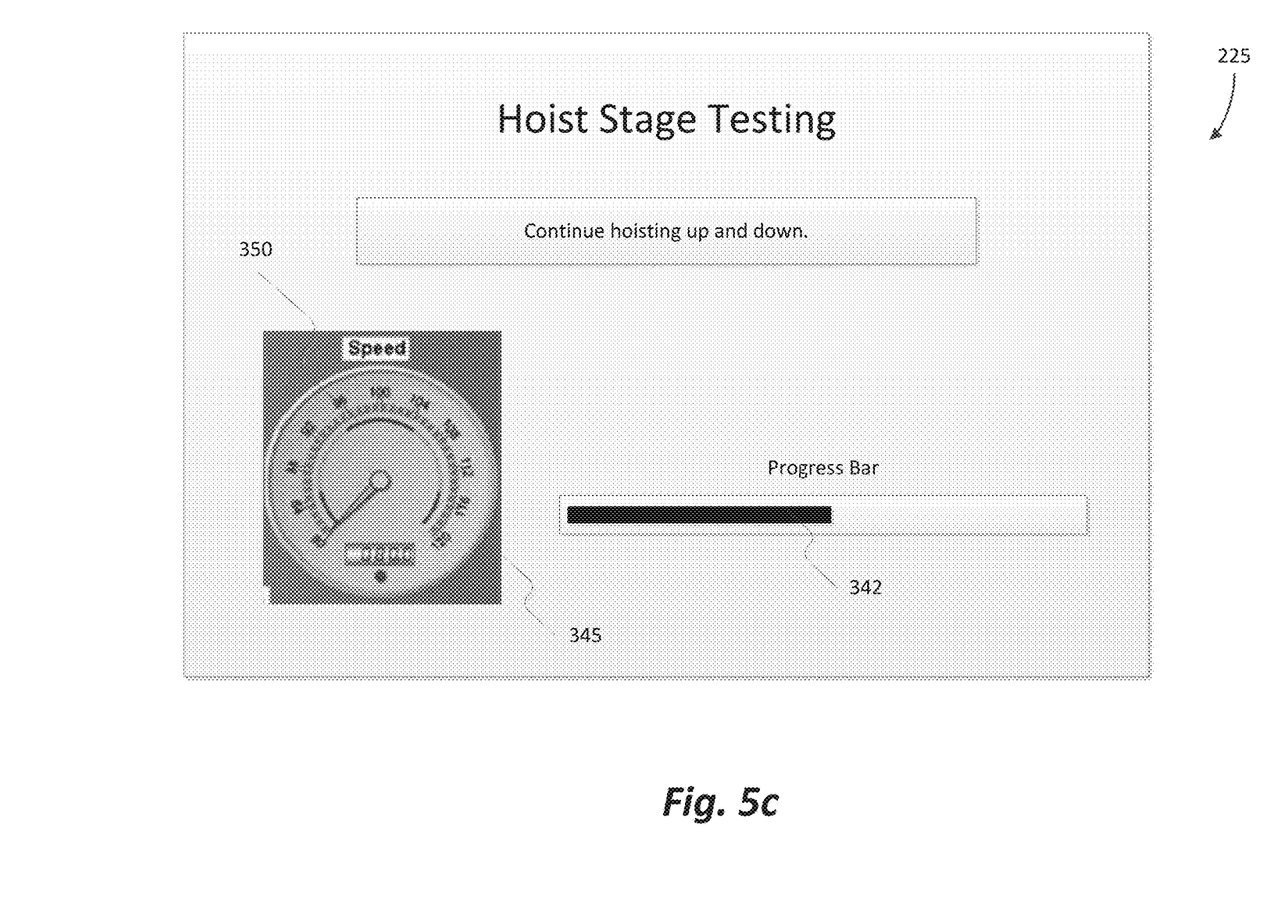
Figure 5D:
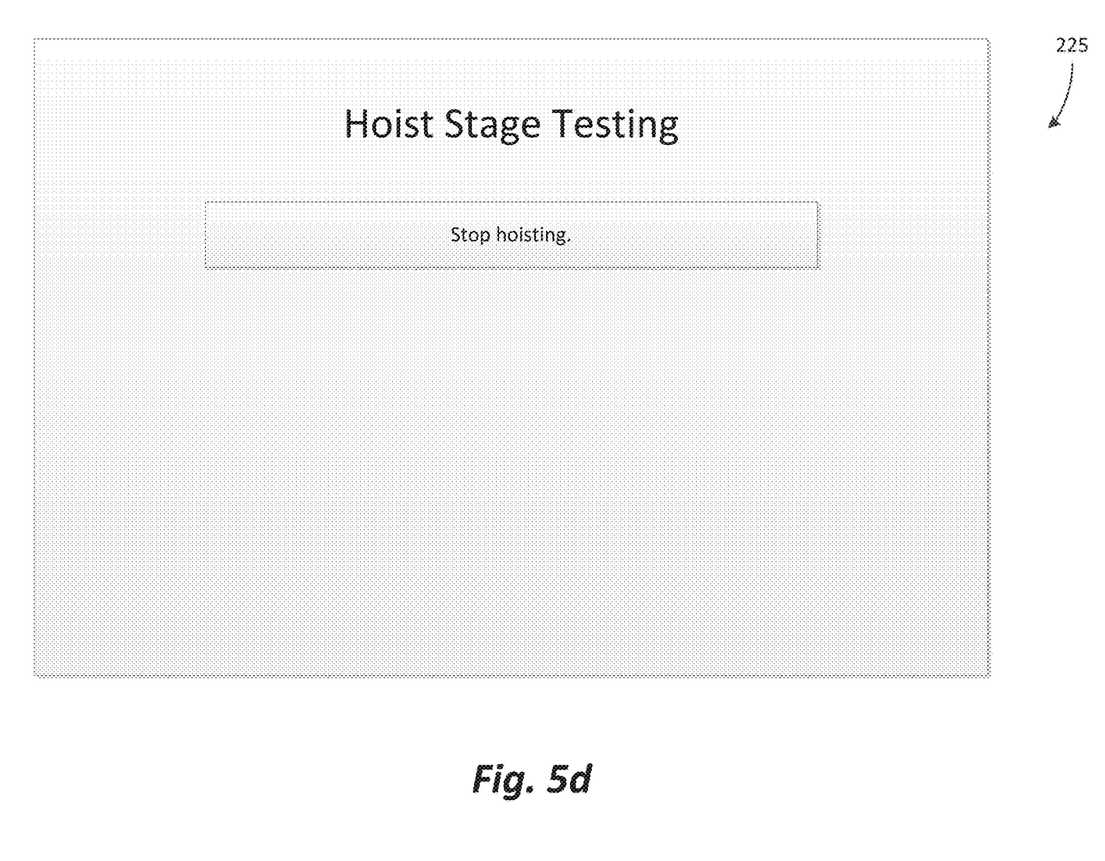

As shown in FIG. 5c, once the operator begins the test, the user-interface 225 will continue to give operating instructions such as "Continue hoisting up and down." The user-interface 225 further includes a progress bar 342 and a speedometer 345. The progress bar 342 informs the operator of his progress during the stage testing. In other embodiments visual or audio progress indicators, other than a progress bar, are used to indicate the operator's progress during stage testing. The speedometer 345 informs the operator of the speed of the moving component of the mining shovel 100. The speedometer 345 includes a target range 350 that indicates to the operator the predefined speed range that the moving component of the mining shovel 100 must be moving at for data to be captured. In some situations, in which the speed of a moving component does not need to be within a predefined speed range, the speedometer 345 is omitted from the user-interface 225. As shown in FIG. 5d, once the stage testing is complete the user-interface 225 instructs the operator to "Stop hoisting."

As the mining machine 100 is operated during the various stage tests, the vibration data is obtained by the accelerometer sensors 305 and stored in a memory (e.g., of the accelerometer sensors 305 or the vibration spectral analysis processor 310). The recorded data is then processed by the vibration spectral analysis processor 310 to generate one or more spectrums 320 corresponding to various components of the mining shovel 100 (processed vibration data). The processed data can then be sent to an off-site location (e.g, server 315) for further analysis or to be displayed locally, such as on the user interface 225. Additionally, the vibration spectral analysis processor 310, server 315, controller 205, or another device may analyze the processed data to determine whether a failure has occurred or is impending on a component of the mining shovel 100. In other words, the peaks 325 of spectrums are analyzed to determine whether they exceed a predetermined threshold or have increased over time at an excessive rate. The predetermined thresholds and rates may be specific to particular components as well. Accordingly, a peak 325 of one spectrum 320 corresponding to one component may be acceptable, but a similar peak 325 of another spectrum 320 corresponding to another component may be at a level that would indicate an issue.

Vibration Data Collection During Operation of Mining Shovel

Another method for collecting vibration data includes collecting the vibration data while the mining shovel 100 is in normal operation, rather than during stage testing. During normal operation, the mining shovel 100 operates in specific cycles, such as digging, swinging towards the dump location, and tucking. These cycles have specific speeds and torques associated with them. During portions of various cycles of the mining shovel 100 operation, the mining shovel 100 will have a constant speed, within the predefined range, and a constant torque, within a predefined range. Torque that remains positive or remains negative (i.e., does not cross the zero-torque threshold) during a particular time period is considered constant during that time period. The control system 200 uses an algorithm to identify the cycle that the mining shovel 100 is performing. In one embodiment, the algorithm uses speed, torque, and position to identify the cycle and trigger data collection. In another embodiment, the algorithm uses the rate of speed increase or decrease to trigger data collection. In another embodiment, the algorithm only uses speed and position to trigger data collection.

Figure 6:
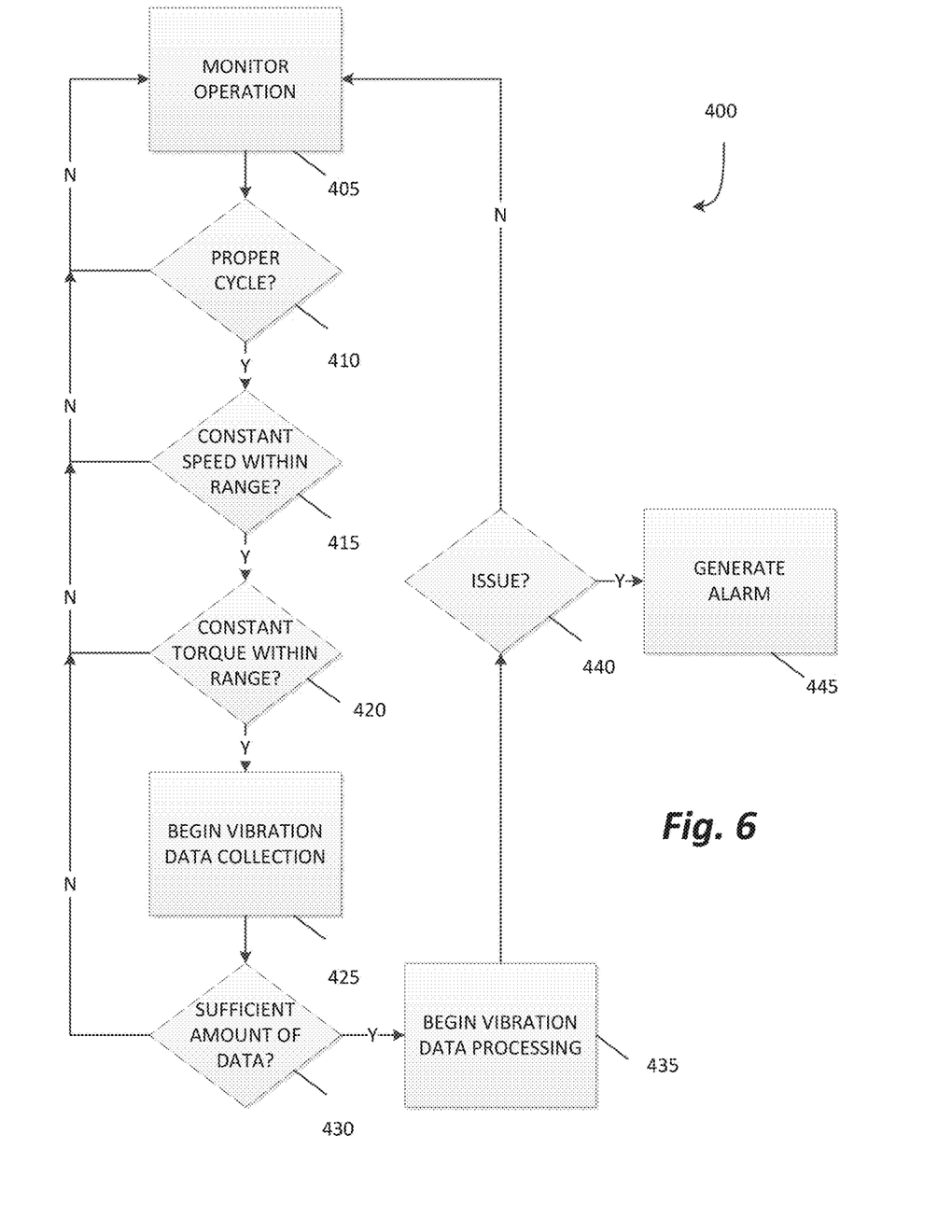
FIG. 6 illustrates a process of collecting vibration data.

FIG. 6 illustrates a process 400 for collecting vibration data during operation of the mining shovel. Process 400 begins by monitoring the operation of the mining shovel 100 (Step 405). The data collection system 300 determines if the mining shovel 100 is in a proper cycle where the speed will remain constant for one to three seconds (Step 410). If the mining shovel 100 is not in a proper cycle, the data collection system 300 reverts back to step 405. If the mining shovel 100 is in a proper cycle, the data collection system 300 determines if a component of the mining shovel 100 is at a constant speed, within the predefined speed range (Step 415). If the component of the mining shovel 100 is not at a constant speed and within the predefined speed range, the data collection system 300 reverts back to step 405. If the component of the mining shovel 100 is at a constant speed, the data collection system 300 determines if the torque is constant and within the predefined torque range (Step 420). If the torque is not constant and within the predefined torque range, the data collection system 300 reverts back to step 405. If the torque is constant and within the predefined torque range, the data collection system 300 begins collecting vibration data (Step 425). The data collection system 300 next determines if a sufficient amount of vibration data has been collected (Step 430). If a sufficient amount of vibration data has not been collected, the data collection system 300 reverts back to step 405. Vibration data may be collected over several cycles. If a sufficient amount of vibration data has been collected, the vibration data is processed by the vibration spectral analysis processor 310 (Step 435). Next, the data collection system 300 or a technician determines if the processed vibration data indicates a mechanical issue (Step 440). If there is not an issue, the data collection system 300 reverts back to step 405. If there is an issue, the data collection system 300 generates an alarm (Step 445). Once the vibration data is processed, the processed vibration data can be sent to an off-site location, such as the server 315, for further analysis. In some embodiments, step 420 is bypassed in the process 400, such that data capture is not triggered based on torque.

Simulated Tachometer

As discussed above, for the data collection system 300 to collect valid vibration measurements, the speed of the components of the mining shovel 100 being tested should remain relatively constant and within the predefined speed range. Thus, the tachometers 307 may be used to monitor the speed of components of the mining machine 100. In some embodiments, such as a mining shovel 100 including direct-current motors, the mining shovel 100 uses simulated tachometers, rather than physical tachometers, as the tachometers 307.

Figure 7:
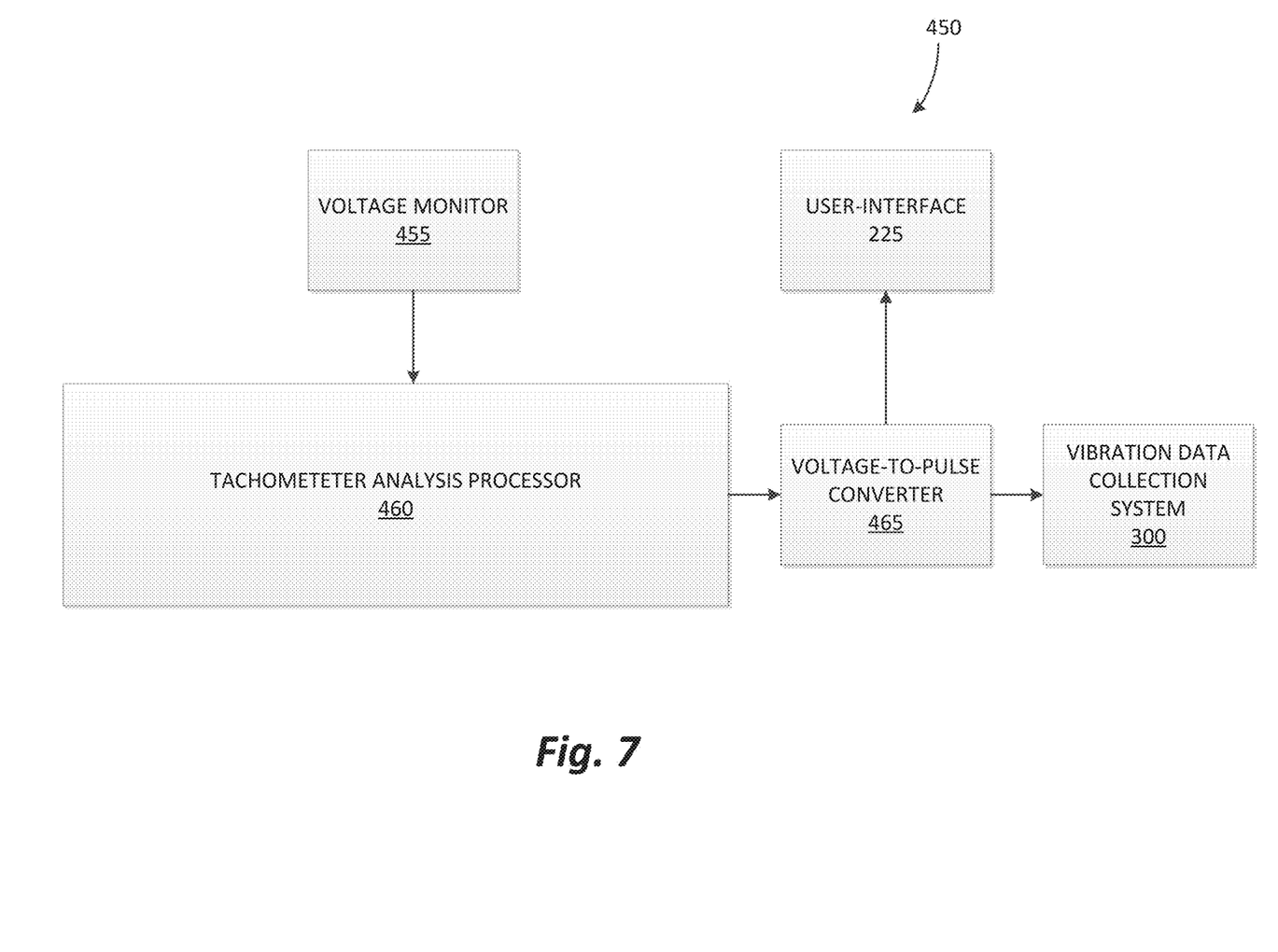
FIG. 7 illustrates a simulated tachometer of the mining shovel.

As shown in FIG. 7, a simulated tachometer 450 is used to determine speed. The simulated tachometer 450 includes a voltage monitor 455, a voltage-to-pulse converter 460, and a simulated tachometer analysis processor 465. The simulated tachometer 450 can then be electrically coupled to the vibration data collection system 300.

The voltage monitor 455 monitors the motor voltage of the mining shovel 100. This monitored voltage is proportional to the speed of the motor. In some embodiments, the motor voltage of the mining shovel 100 is monitored by the control system 200, and a separate voltage monitor 455 is unnecessary. The monitored voltage is outputted to the tachometer analysis processor 460, which then outputs a voltage analog signal. In some embodiment, the tachometer analysis processor 460 outputs the voltage analog signal to a voltage-to-pulse converter 460. The voltage-to-pulse converter 465 converts the voltage analog signal (e.g., 24 volts) to a frequency (e.g., 1000 Hz). The frequency, which is representative of the speed of the motor of the mining machine 100, is then outputted to the vibration data collection system 300, the user-interface 225, or both. In some embodiments, the voltage analog signal is outputted directly to the vibration data collection system 300, the user-interface 225, or both, and a voltage-to-pulse converter 465 is unnecessary. In some embodiments, the simulated tachometer 450 uses the motor current in conjunction with the motor voltage to determine a speed of the motor of the mining machine 100.

Thus, the invention provides, among other things, a method and system for vibration testing of an electric mining shovel. Various features and advantages of the invention are set forth in the following claims.

What is claimed is:

1. A mining machine having a control system for operating the mining machine, the control system having a vibration monitor, the mining machine comprising:
    a sensor sensing vibration of a component of the mining machine; and
    a vibration control system
        determining when the mining machine is moving in a proper cycle,
        triggering the acquisition of vibration sensor data from the sensor in response to determining that the mining machine is moving in the proper cycle, wherein the proper cycle includes at least one selected from the group consisting of a digging action, a swinging action, and a tucking action,
        processing the vibration sensor data to generate processed vibration data, and
        outputting the processed vibration data.

2. The mining machine of claim 1, wherein the sensor is an accelerometer.

3. The mining machine of claim 1, further comprising a tachometer that monitors speed of the mining machine while operating in the proper cycle.

4. The mining machine of claim 3, wherein the tachometer is a simulated tachometer including a voltage monitor.

5. The mining machine of claim 1, further comprising a user-interface that indicates at least one of an amount of the vibration sensor data collected and the processed vibration data.

6. The mining machine of claim 1, further including a network for communicating the processed vibration data.

7. The mining machine of claim 6, wherein the processed vibration data is displayed at a remote location.

8. The mining machine of claim 1, wherein the vibration control system further monitors the speed of the component of the mining machine and obtains the vibration sensor data further based on determining that the component is moving at a constant speed within a predefined speed range.

9. The mining machine of claim 1, wherein the vibration control system further monitors torque of the component of the mining machine and obtains the vibration sensor data further based on determining that the component has a constant torque within a predefined range.

10. The mining machine of claim 1, wherein the proper cycle is at least one of a digging operation, a swinging operation, and a tucking operation.

11. The mining machine of claim 1, wherein the vibration control system further obtains vibration sensor data from the sensor upon determining a speed of the component of the mining machine is within a predefined speed range.

12. The mining machine of claim 1, wherein the vibration control system further obtains vibration sensor data from the sensor upon determining a torque of the component of the mining machine is within a predefined torque range.

13. The mining machine of claim 1, wherein the vibration control system further comprises generating an alarm when the processed vibration data indicates a mechanical issue with the component of the mining machine.

14. A method for monitoring mining equipment, the method comprising:
    monitoring operation of a mining machine;
    determining that a component of the mining machine is moving in a proper cycle;
    determining that the component of the mining machine is moving at a constant speed;
    triggering, by a processor, the acquisition of vibration data of the mining machine in response to determining that the component of the mining machine is moving in the proper cycle and at the constant speed, wherein the proper cycle includes at least one selected from the group consisting of a digging action, a swinging action, and a tucking action;
    processing, using the processor, the vibration data to generate processed vibration data; and
    outputting the processed vibration data.

15. The method of claim 14, further including determining that the component of the mining machine is moving with a constant torque.

16. The method of claim 15, wherein the component of the mining machine is moving with a constant torque within a predefined range.

17. The method of claim 14, wherein the component of the mining machine is moving at a constant speed within a predefined range.

18. The method of claim 14, further comprising obtaining, by the processor, vibration sensor data from the sensor upon determining a torque of the component of the mining machine is within a predefined torque range.

19. A mining machine having a control system for operating the mining machine, the control system having a vibration monitor, the mining machine comprising:
    a user-interface providing instructions to operate a component of the mining machine in a predetermined pattern, wherein the predetermined pattern includes at least one selected from the group consisting of a hoisting action, a crowding action, and a swinging action;
    the component of the mining machine moving in the predetermined pattern;
    a sensor sensing vibration of the component of the mining machine while operating in the predetermined pattern, the sensor outputting vibration sensor data; and
    a processor
        receiving the vibration sensor data from the sensor,
        processing the vibration sensor data, and
        outputting the processed vibration data.

20. The mining machine of claim 19, wherein the predetermined pattern includes at least one selected from the group consisting of a hoisting action, a crowding action, and a swinging action.

21. The mining machine of claim 19, wherein the component is at least one selected from the group consisting of a dipper shaft, a handle, and a dipper.

22. A mining machine having a control system for operating the mining machine, the mining machine comprising:
    a user-interface providing instructions to operate the mining machine in a predetermined pattern, wherein the predetermined pattern includes at least one selected from the group consisting of a hoisting action, a crowding action, and a swinging action;
    the mining machine operating in the predetermined pattern;

a sensor sensing a parameter of the mining machine while operating in the predetermined pattern, the sensor outputting sensor data representing the sensed parameter; and a processor
receiving the sensor data from the sensor,
processing the sensor data, and
outputting the processed sensor data.

23. The mining machine of claim 22, wherein the parameter sensed is vibration, torque, or speed.

24. The mining machine of claim 22, wherein the sensor is an accelerometer that senses vibration.

25. The mining machine of claim 22, further comprising a tachometer that monitors speed of the mining machine while operating in the predetermined pattern.

26. The mining machine of claim 25, wherein the tachometer is a simulated tachometer including a voltage monitor.

27. The mining machine of claim 22, wherein the predetermined pattern is at least one of moving a hoist up and down, moving a crowd in and out, and swinging a handle side to side.

28. The mining machine of claim 22, wherein the parameter is vibration and wherein processing the sensor data includes performing a Fourier transform on the sensor data.

29. The mining machine of claim 22, wherein the user-interface further indicates at least one of an amount of the sensor data collected and the processed sensor data outputted by the processor.

30. The mining machine of claim 22, wherein the mining machine is moved in the predetermined pattern until an amount of collected sensor data exceeds a threshold.

31. The mining machine of claim 22, further including a network for communicating the processed sensor data outputted by the processor.

32. The mining machine of claim 31, wherein the processed sensor data is displayed at a remote location.

33. The mining machine of claim 22, wherein the predetermined pattern includes at least one selected from the group consisting of a hoisting action, a crowding action, and a swinging action.

* * * * *